2,992,143
ACID PRIMARY CELLS
John E. Clifford, Columbus, John McCallum, Worthington, and Donald E. Semones, Hilliards, Ohio, assignors, by mesne assignments, to Remington Arms Company, Inc., Bridgeport, Conn., a corporation of Delaware
No Drawing. Filed Oct. 14, 1958, Ser. No. 767,090
6 Claims. (Cl. 136—154)

This invention relates to primary cells having titanium-containing anodes, and phosphoric acid electrolytes. The anodes comprise alloys containing at least 50 atomic percent titanium. The cathodes may comprise any suitable polarizers, lead dioxide being preferred for the original acid primary cell systems described here. The original acid ingredient in any given electrolyte may be any form of phosphoric acid, hypo-, meta-, ortho-, or pyro-, or phosphorus penta-oxide. The composition of the aqueous solution depends upon the relative concentrations of hydrogen, phosphorus, and oxygen atoms, regardless of the original form of the acid placed in the water. For convenience herein, concentrations are specified as weight percentages of ortho-phosphoric acid, $H_3PO_4$, in water. It is understood, however, that any convenient starting materials may be used to obtain the specified concentrations. The useful range of ortho-phosphoric acid concentration is 30 to 100 weight percent. The preferred concentration range is 30 to 85 weight percent ortho-phosphoric acid. The phosphoric acid may also contain fluoride ion as an electrolyte additive. The fluoride ion can be used as an additive in all of the phosphoric acid concentrations within the useful range. However, 30 to 85 weight percent is also the preferred ortho-phosphoric acid concentration for use with the fluoride additive.

Typical anodes for use in these electrolytes are Ti—27 Mo—10 Al and Ti—27 Mo—10 Nb (where not otherwise specified, numbers indicate weight percent). The aluminum-containing alloy provides high rate of discharge in a given electrolyte, where cell life is less important. The niobium-containing alloy provides long cell life in a given electrolyte where high rate of discharge is less important. The alloy Ti—30 Mo may also be used for long cell life.

A unique feature of this invention is that the fluoride additive is not consumed electrochemically during cell discharge.

Primary cells according to this invention provide higher voltages than those of alkaline primary cells using titanium-containing anodes. Phosphoric acid cells using Ti—27 Mo—10 Nb anodes provide 10 to 50 percent higher voltages than alkaline cells using the same anode. (See Tables I and III.) The addition of fluoride to the phosphoric acid electrolytes provides still higher voltages, higher rates of energy output per unit weight or per unit area, and higher total energy outputs.

These advantages are important, as high working voltage under load, maximum discharge rate from a fixed cell size, and total cell capacity at useful wattages are factors emphasized in the primary cell trade.

Table I, below, lists properties of two typical titanium alloy anodes in concentrated electrolytes, showing that: (A) The phosphoric acid cells have higher voltages than the comparable alkaline cell. (B) The cell voltage and the available anode current densities for the Ti—27 Mo—10 Al alloy cell are greater in 85 percent $H_3PO_4$ than in $H_4P_2O_7$. (C) The Ti-Mo-Al alloy provides greater voltages and higher anode current densities in the 85 percent phosphoric acid than the Ti-Mo-Nb alloy.

Table I. *Titanium alloy electrodes in electrolytes without additives*

| Example | Alloy Anode Composition, weight percent | Electrolyte | Anode Discharge Properties, Closed Circuit Voltage, Volts vs. $PbO_2$ at Anode Current Density, ma./in.² | | | |
|---|---|---|---|---|---|---|
| | | | Zero | 0.01 | 0.02 | 0.10 |
| 1 | Ti—27 Mo—10 Al | Pyrophosphoric Acid, $H_4P_2O_7$ (equivalent to "110" weight percent $H_3PO_4$). | 1.50 | 1.35 | 1.23 | |
| 2 | Ti—27 Mo—10 Al | 85 weight percent $H_3PO_4$ | 1.90 | | 1.7 | 1.5 |
| 3 | Ti—27 Mo—10 Nb | do | 1.33 | 1.20 | 1.10 | 1.0 |
| 4 | Ti—27 Mo—10 Nb | 55 percent KOH | ¹1.10 | ¹1.00 | | ¹0.95 |

¹ Volts vs. HgO depolarizer.

Table II, below, lists properties of the Ti—27 Mo—10 Al alloy anode in different concentrations of phosphoric acid with all of the electrolytes containing 0.2 molar fluoride ion. The data show increased voltage and increased available anode current density with decreased concentration of $H_3PO_4$. The concentration range 30 to 85 percent provides higher voltages and higher polarizing anode current densities. The addition of $(F)^-$ to the electrolyte increases the voltage under load, as is apparent from a comparison of Example 5 (Table II) with Example 1 (Table I), and of Example 7 (Table II) with Example 2 (Table I).

Table II.—*Ti—27 Mo—10 Al anode in phosphoric acids containing 0.2 molar fluoride ion*

| Example | Ortho-phosphoric Acid Concentration, Weight percent +0.2 M (F)⁻ | Anode Discharge Properties, Closed Circuit Voltage, volts vs. $PbO_2$ at anode current density, ma./in.² | | | | Polarizing Current Density, ma./in.² |
|---|---|---|---|---|---|---|
| | | Zero | 0.01 | 0.10 | 1.0 | |
| 5 | "110" (Pyrophosphoric Acid) | 1.78 | 1.76 | 1.57 | | 0.2 |
| 6 | 100 | 1.70 | 1.68 | 1.62 | | 0.2 |
| 7 | 85 | 1.82 | 1.80 | 1.71 | | 0.4 |
| 8 | 50 | 1.92 | 1.91 | 1.90 | 1.89 | 4 to 10 |
| 9 | 30 | 1.89 | 1.87 | 1.87 | 1.87 | 8 |

Table III, below, shows that the Ti—27 Mo—10 Nb anode is more corrosion resistant than the the Ti—27 Mo—10 Al anode in 50 weight percent phosphoric acid containing about 0.2 M (F)⁻. This electrolyte was the most corrosive of those tested, yet no corrosion was observed at the Ti—27 Mo—10 Nb anode. These facts mean that long cell shelf life is obtained with the Ti—27 Mo—10 Nb cell; while the Ti—27 Mo—10 Al cell, having shorter shelf-life provides higher voltages.

Table III.—Comparison of titanium alloy anodes

|  | Ti—27 Mo—10 Al in 50% $H_3PO_4$+ 0.2 M (F)- | Ti—27 Mo—10 Nb in 50% $H_3PO_4$+ 0.2 M (F)- | Ti—27 Mo—10 Nb in 55% KOH |
|---|---|---|---|
| Open Circuit Voltage, volts | 1.92 [1] | 1.54 [1] | 1.1.[2] |
| Closed Circuit Voltage, volts at Anode Current Density: | | | |
| 0.01 ma./in.² | 1.91 | 1.44 | 1.0. |
| 0.10 ma./in.² | 1.90 | 1.23 | 0.95. |
| 1.0 ma./in.² | 1.89 | 1.0 | 0.85. |
| Corrosion at Anode | vigorous evolving gas. | no gas evolution | no gas evolution. |

[1] Volts versus a lead dioxide depolarizer.
[2] Volts versus a mercuric oxide depolarizer.

Table IV, below, shows that the addition of 0.2 molar fluoride ion to 85 percent phosphoric acid provides the following improvements for a 1.6-gram sintered Ti—27 Mo—10 Al anode.

(1) The cell voltage is increased about 0.1 to 0.6 volt, depending on the load.
(2) The discharge rate is increased about 2 to 4 times.
(3) The total energy output for a given anode weight or area is increased by two to several times.

Table IV

| Duration of Load, minutes | Discharge Current, milliamperes per 1.6 g. of sinter | Voltage, Volts vs. $PbO_2$ Reference | |
|---|---|---|---|
| | | in 85% $H_3PO_4$+ 0.2 M (F)- | in 85% $H_3PO_4$ |
| 2 | 1 | 1.75 | 1.46 |
| 3 | 2 | 1.75 | |
| 2 | 4 | 1.72 | 1.12 [1] |
| 8 | 8 | 1.58 | |
| 6 | 15 | 1.47 | |
| 29 | 2 | | 1.1 |

[1] In the absence of (F)-, the sinter polarized to 0.975 volt by another 7 minutes at 4 milliamperes. The current was changed to 2 milliamperes and the voltage rose to about 1.1 volts by 29 minutes.

Another test with a second 1.6 gram Ti—27 Mo—10 Al sinter indicated that 2 milliamperes is about the highest current obtainable for an extended time in 85 percent $H_3PO_4$. With this sinter, complete polarization occurred in about 5 minutes at 4 milliamperes, but the voltage at 2 milliamperes was steady at 1.19 volts for about 16 hours. On the other hand, the first sinter provided a steady 1.17 volts at 4 milliamperes for 16 hours in the 85 percent $H_3PO_4$ with (F)- present.

The fluoride ion is not consumed electrochemically during cell discharge. The sinter was discharged a total of about 43 ampere minutes in the 85 percent $H_3PO_4$ containing only the equivalent of about 8.1 ampere minutes of fluoride. Discharge rates of 3 to 4 milliamperes were maintained for 16 hour periods per day for 12 days. If the fluoride ion had been consumed the anode would have polarized.

No improvement is observed when the fluoride concentration is as low as about 0.02 molar. At least about 0.05 M fluoride ion is necessary to activate the titanium alloy anode. The preferred range for fluoride concentration is from about 0.05 to 0.2 molar; but higher concentrations up to saturation of the phosphoric acid with fluoride salt may be used for larger rates of discharge. The fluoride may be added as $NH_4F \cdot HF$, $NH_4F$, KF, or other fluoride salts.

What is claimed is:
1. A primary cell comprising a cathode, an alloy anode consisting essentially of at least 50 atomic percent titanium, the remainder being essentially molybdenum and a material of the group consisting of aluminum and niobium, and an electrolyte consisting essentially of an aqueous solution of from about 30 to 100 weight percent ortho-phosphoric acid.

2. A primary cell comprising a cathode, an alloy anode consisting essentially of at least 50 atomic percent titanium, the remainder being essentially molybdenum and a material of the group consisting of aluminum and niobium, and an electrolyte consisting essentially of an aqueous solution of from about 30 to 85 weight percent ortho-phosphoric acid.

3. A primary cell comprising a cathode, an alloy anode consisting essentially of at least 50 atomic percent titanium, the remainder being essentially molybdenum and a material of the group consisting of aluminum and niobium, and an electrolyte consisting essentially of an aqueous solution of about 50 weight percent ortho-phosphoric acid.

4. A primary cell comprising a cathode, an alloy anode consisting essentially of at least 50 atomic percent titanium, the remainder being essentially molybdenum and a material of the group consisting of aluminum and niobium, and an electrolyte consisting essentially of an aqueous solution of from about 30 to 100 weight percent ortho-phosphoric acid and from about 0.05 to 0.2 molar fluoride ion.

5. A primary cell comprising a cathode, an alloy anode consisting essentially of at least 50 atomic percent titanium, the remainder being essentially molybdenum and a material of the group consisting of aluminum and niobium, and an electrolyte consisting essentially of an aqueous solution of from about 30 to 85 weight percent ortho-phosphoric acid and from about 0.05 to 0.2 molar fluoride ion.

6. A primary cell comprising a cathode, an alloy anode consisting essentially of at least 50 atomic percent titanium, the remainder being essentially molybdenum and a material of the group consisting of aluminum and niobium, and an electrolyte consisting essentially of an aqueous solution of about 50 weight percent ortho-phosphoric acid and from about 0.05 to 0.2 molar fluoride ion.

References Cited in the file of this patent

UNITED STATES PATENTS

| 717,108 | Morrison | Dec. 30, 1902 |
| 1,748,485 | Kugel | Feb. 25, 1930 |
| 2,631,115 | Fox | Mar. 10, 1953 |